US012614919B2

(12) United States Patent　　(10) Patent No.: US 12,614,919 B2

Matsumoto　　(45) Date of Patent: Apr. 28, 2026

(54) UNINTERRUPTIBLE POWER SUPPLY APPARATUS

(71) Applicant: TMEIC Corporation, Tokyo (JP)

(72) Inventor: Jun Matsumoto, Chuo-ku (JP)

(73) Assignee: TMEIC Corporation, Tokyo (JP)

( * ) Notice: Subject to any disclaimer, the term of this patent is extended or adjusted under 35 U.S.C. 154(b) by 0 days.

(21) Appl. No.: 18/853,273

(22) PCT Filed: Mar. 6, 2023

(86) PCT No.: PCT/JP2023/008313

§ 371 (c)(1),
(2) Date: Oct. 1, 2024

(87) PCT Pub. No.: WO2024/185005

PCT Pub. Date: Sep. 12, 2024

(65) Prior Publication Data

US 2025/0219441 A1　　Jul. 3, 2025

(51) Int. Cl.
*H02J 7/00* (2026.01)
*H02J 7/02* (2016.01)
(Continued)

(52) U.S. Cl.
CPC ............ *H02J 9/062* (2013.01); *H02J 7/0063* (2013.01); *H02J 7/02* (2013.01); *H02M 1/007* (2021.05);
(Continued)

(58) Field of Classification Search
CPC .. H02J 9/062; H02J 7/0063; H02J 7/02; H02J 9/06; H02J 7/00; H02M 1/007;
(Continued)

(56) References Cited

U.S. PATENT DOCUMENTS 11,489,362 B1 * 11/2022 Luke ...................... H02J 9/068
2024/0120769 A1 　 4/2024 Kano et al.

FOREIGN PATENT DOCUMENTS

JP 　　 2009044794 　 * 2/2009
JP 　　 2011-188706 A 　 9/2011
(Continued)

OTHER PUBLICATIONS

International Search Report and Written Opinion issued Apr. 11, 2023 in PCT/JP2023/008313 filed Mar. 6, 2023, citing documents 16-18 therein, 10 pages (with English translation).
(Continued)

*Primary Examiner* — Daniel Cavallari
*Assistant Examiner* — Xuan Ly
(74) *Attorney, Agent, or Firm* — Oblon, McClelland, Maier & Neustadt, L.L.P.

(57) ABSTRACT

An uninterruptible power supply apparatus includes an AC/DC converter that converts AC power supplied from a commercial AC power supply into DC power and supplies the DC power to a DC line, a DC/AC converter that converts the DC power received from the DC line into AC power and supplies the AC power to a load, a DC/DC converter that provides and receives DC power between the DC line and a battery, and a bidirectional converter that, in high-speed charging of the battery, operates in cooperation with the AC/DC converter, converts the AC power supplied from the commercial AC power supply into DC power, and supplies the DC power to the DC line. This can prevent a shortage of DC power during a high-speed charging operation and enables high-speed charging of the battery while supplying rated power to the load.

5 Claims, 13 Drawing Sheets

(51) Int. Cl.

| | |
|---|---|
| *H02J 9/06* | (2006.01) |
| *H02M 1/00* | (2007.01) |
| *H02M 1/12* | (2006.01) |
| *H02M 1/14* | (2006.01) |
| *H02M 1/44* | (2007.01) |
| *H02M 7/219* | (2006.01) |
| *H02M 7/521* | (2006.01) |

(52) U.S. Cl.
CPC ............. *H02M 1/126* (2013.01); *H02M 1/14*
(2013.01); *H02M 1/44* (2013.01); *H02M*
*7/219* (2013.01); *H02M 7/521* (2013.01)

(58) Field of Classification Search
CPC .......... H02M 1/126; H02M 1/14; H02M 1/44;
H02M 7/219; H02M 7/521; H02M 1/32;
H02M 1/36; H02M 7/5387; H02M 7/797;
H02M 1/00; H02M 1/12; Y02E 60/10
USPC .......................................................... 307/64
See application file for complete search history.

(56) References Cited

FOREIGN PATENT DOCUMENTS

| | | | | |
|---|---|---|---|---|
| JP | 2016-59240 | A | | 4/2016 |
| JP | 2016059240 | | * | 4/2016 |
| JP | 2017-50953 | A | | 3/2017 |
| JP | 2018-11487 | A | | 1/2018 |
| JP | 7073590 | B1 | | 5/2022 |
| WO | WO 2014/057298 | A1 | | 4/2014 |

OTHER PUBLICATIONS

Japanese Office Action issued Jul. 16, 2024 in Japanese Application 2023-561021, citing documents 19-20, 4 pages (with English Translation).

* cited by examiner

UNINTERRUPTIBLE POWER SUPPLY APPARATUS

TECHNICAL FIELD

The present disclosure relates to uninterruptible power supply apparatuses, and particularly, to an uninterruptible power supply apparatus that converts alternate-current (AC) power supplied from an AC power supply to direct-current (DC) power, converts the DC power into AC power, and then supplies the AC power to a load.

BACKGROUND ART

For example, Japanese Patent No. 7073590 (PTL 1) discloses an uninterruptible power supply apparatus including first, second, and third power converters. In a normal state of an AC power supply, the first power converter converts AC power supplied from the AC power supply into DC power and supplies the DC power to a DC line. In a power failure of the AC power supply, an operation of the first power converter is stopped. The second power converter converts the DC power supplied from the DC line into AC power and supplies the AC power to a load. The third power converter stores the DC power received from the DC line in a power storage device in the normal state of the AC power supply and supplies the DC power of the power storage device to the DC line in the power failure of the AC power supply. Thus, even when a power failure has occurred in the AC power supply, an operation of the load can be continued during a period in which the DC power is stored in the power storage device.

CITATION LIST

Patent Literature

PTL 1: Japanese Patent No. 7073590

SUMMARY OF INVENTION

Technical Problem

Conventionally, lead batteries have been mainly used as power storage devices, but in recent years, lithium-ion batteries have begun to be used as power storage devices. The lithium-ion battery is characterized in that it has a larger capacity per unit volume than the lead battery and it is capable of high-speed charging. Thus, high-speed charging (high-power charging) of a power storage device may be required for a recent uninterruptible power supply apparatus.

The uninterruptible power supply apparatus is normally designed to have an input capacity (a capacity of a first power converter) and an output capacity (a capacity of a second power converter) that are equal to each other. This may lead to a shortage of DC power generated by the first power converter when high-speed charging of the power storage device is performed while the load is being operated.

As a measure against such a problem, a method of selecting a high-capacity uninterruptible power supply apparatus is conceivable, but an excess capacity increases, leading to higher cost. A method of charging a lithium-ion battery using an external charger is also conceivable, but even this method leads to higher cost by an amount of the external charger.

Therefore, a main object of the present disclosure is to provide an uninterruptible power supply apparatus that can perform high-speed charging of a power storage device while operating a load and that is low in cost.

Solution to Problem

An uninterruptible power supply apparatus according to the present disclosure includes first, second, third, and fourth power converters. In a normal state of an AC power supply, the first power converter converts AC power supplied from the AC power supply into DC power and supplies the DC power to a DC line. In a power failure of the AC power supply, an operation of the first power converter is stopped. The second power converter converts the DC power received from the DC line into AC power and supplies the AC power to a load. The third power converter stores the DC power received from the DC line in a power storage device in the normal state of the AC power supply, and supplies the DC power of the power storage device to the DC line in the power failure of the AC power supply. In a first case where high-speed charging of the power storage device is performed, the fourth power converter operates in cooperation with the first power converter, converts the AC power supplied from the AC power supply into DC power, and supplies the DC power to the DC line.

Advantageous Effects of Invention

In the uninterruptible power supply apparatus according to the present disclosure, the fourth power converter is provided that, when high-speed charging of the power storage device is performed, operates in cooperation with the first power converter, converts the AC power supplied from the AC power supply into DC power, and supplies the DC power to the DC line. Thus, DC power can be generated by the first and fourth power converters during a high-speed charging operation, preventing a shortage of the DC power and enabling high-speed charging of the power storage device while operating the load. Also, cost can be lower than when a high-capacity uninterruptible power supply apparatus is used or an external charger is added.

DESCRIPTION OF EMBODIMENTS

Figure 1:
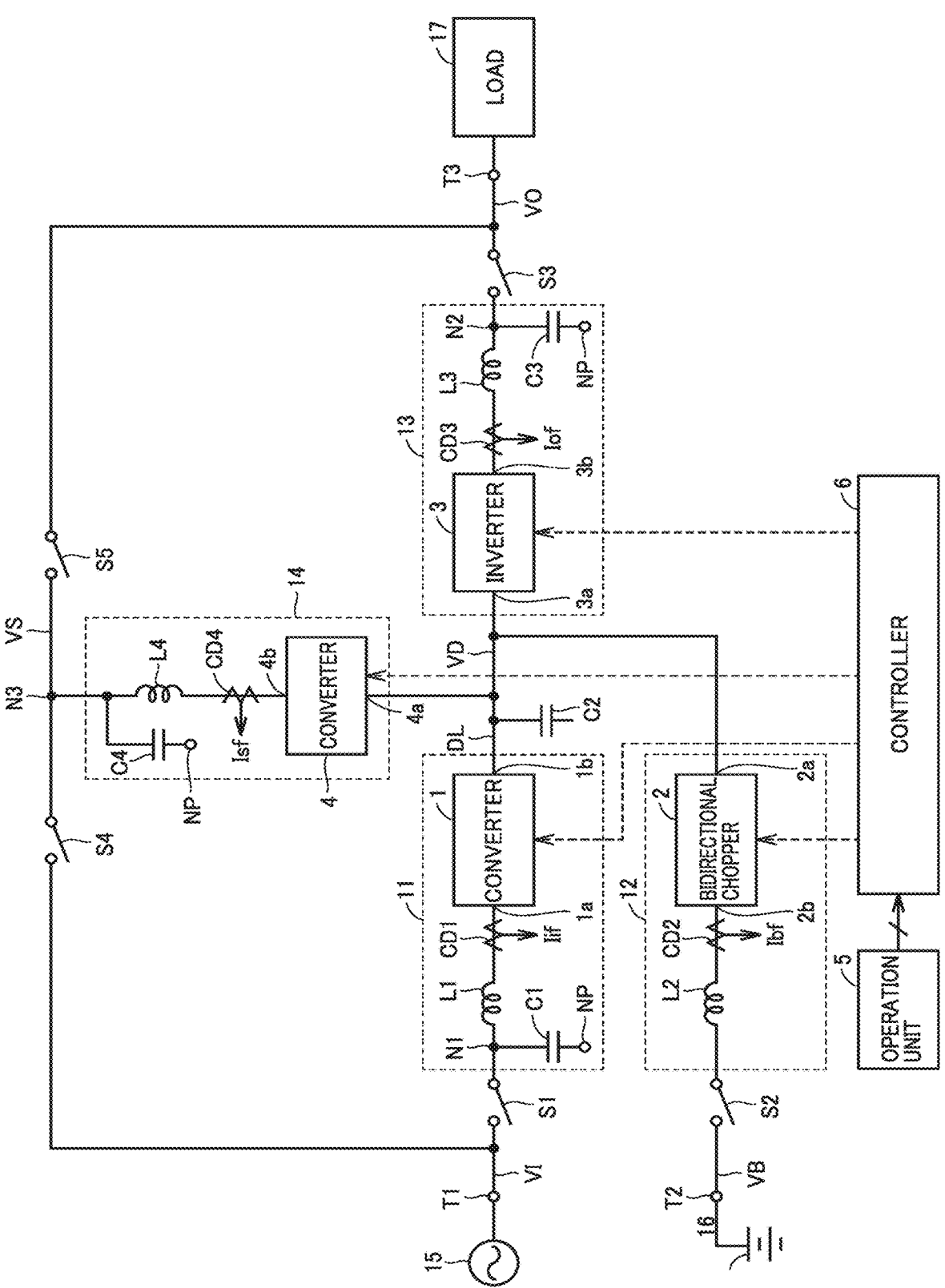
FIG. 1 is a circuit block diagram showing a configuration of an uninterruptible power supply apparatus according to an embodiment of the present disclosure.

FIG. 1 is a circuit block diagram showing a configuration of an uninterruptible power supply apparatus according to an embodiment of the present disclosure. In FIG. 1, the uninterruptible power supply apparatus includes an AC input terminal T1, a battery terminal T2, and an AC output terminal T3. AC input terminal T1 receives AC power of a commercial frequency from a commercial AC power supply 15.

Battery terminal T2 is connected to a battery 16 (power storage device). Battery 16 stores DC power. A lithium-ion battery is used as battery 16. Alternatively, a lead storage battery may be used in place of the lithium-ion battery, or an electric double layer capacitor or a flywheel may be connected in place of battery 16. AC output terminal T3 is connected to a load 17. Load 17 is driven by the AC power supplied from the uninterruptible power supply apparatus.

Although this uninterruptible power supply apparatus receives three-phase AC voltages from commercial AC power supply 15 and supplies the three-phase AC voltages to load 17 in practice, for simplicity of the drawings and description, FIG. 1 shows only a portion related to a one-phase AC voltage.

This uninterruptible power supply apparatus further includes switches S1 to S5, capacitors C1 to C4, reactors L1 to L4, current detectors CD1 to CD4, converters 1, 4, a DC line DL, a bidirectional chopper 2, an inverter 3, an operation unit 5, and a controller 6.

Switch S1 and reactor L1 are connected in series between AC input terminal T1 and an AC node 1a of converter 1. Switch S1 is controlled by controller 6. When AC power is normally supplied from commercial AC power supply 15 (in a normal state of commercial AC power supply 15), switch S1 is turned on. When the AC power from commercial AC power supply 15 is no longer supplied normally (in a power failure of commercial AC power supply 15), switch S1 is turned off. Current detector CD1 detects a current Ii flowing between commercial AC power supply 15 and converter 1 and outputs a signal Iif, which indicates a detection value thereof, to controller 6.

An instantaneous value of an AC input voltage VI that appears at AC input terminal T1 is detected by controller 6. Controller 6 determines whether a power failure has occurred based on a detection value of AC input voltage VI. Also, controller 6 controls converter 1 or the like in synchronization with AC input voltage VI.

Capacitor C1 is connected between a neutral point NP and a node N1 located between switch S1 and reactor L1. Capacitor C1 and reactor L1 constitute an AC filter. The AC filter, which is a low-pass filter, passes AC power of a commercial frequency from commercial AC power supply 15 to converter 1 and prevents a signal of a switching frequency generated in converter 1 from passing to commercial AC power supply 15.

Converter 1 is a well-known one including a plurality of transistors and a plurality of diodes and is controlled by controller 6. In the normal state of commercial AC power supply 15, converter 1 converts AC power into DC power and outputs the DC power to a DC node 1d. DC node 1d is connected to DC line DL. A voltage output from converter 1 can be controlled to a desired value. In a power failure of commercial AC power supply 15, an operation of converter 1 is stopped.

Capacitor C1, reactor L1, and converter 1 constitute an AC/DC converter 11 (first power converter), which converts AC power into DC power. Capacitor C2 is connected to DC line DL and smooths a voltage of DC line DL. An instantaneous value of a DC voltage VD that appears in DC line DL is detected by controller 6.

Controller 6 controls converter 1 such that DC voltage VD of DC line DL becomes equal to a reference voltage VDR in the normal state of commercial AC power supply 15 and stops an operation of converter 1 in the power failure of commercial AC power supply 15.

DC line DL is connected to a high-voltage-side node 2a of bidirectional chopper 2, and a low-voltage-side node 2b of bidirectional chopper 2 is connected to battery terminal T2 via a reactor L2 and a switch S2. Switch S2 is turned on during use of the uninterruptible power supply apparatus and is turned off during maintenance of, for example, the uninterruptible power supply apparatus and battery 16. Reactor L2 smooths a current Ib flowing between bidirectional chopper 2 and battery 16.

Bidirectional chopper 2 is a well-known one including a plurality of transistors and a plurality of diodes and is controlled by controller 6. The capacity of bidirectional chopper 2 is set to the same value as that of the capacity of converter 1.

Basically, bidirectional chopper 2 stores the DC power received from DC line DL in battery 16 in the normal state of commercial AC power supply 15 and supplies the DC power of battery 16 to DC line DL in the power failure of commercial AC power supply 15. Note that during an overload operation even in the normal state of commercial AC power supply 15, bidirectional chopper 2 supplies the DC power of battery 16 to inverter 3 through DC line DL.

When storing DC power in battery 16, bidirectional chopper 2 steps down DC voltage VD of DC line DL and supplies DC voltage VD to battery 16. Also, when supplying the DC power of battery 16 to inverter 3, bidirectional chopper 2 steps up a terminal-to-terminal voltage VB of battery 16 and supplies terminal-to-terminal voltage VB to DC line DL.

Bidirectional chopper 2 and reactor L2 constitute a DC/DC converter 12 (third power converter), which provides and receives DC power between DC line DL and battery 16.

Current detector CD2 detects current Ib flowing between bidirectional chopper 2 and battery 16 and outputs a signal Ibf, which indicates a detection value thereof, to controller 6. An instantaneous value of terminal-to-terminal voltage VB of battery 16 that appears at battery terminal T2 is detected by controller 6.

Basically, controller 6 controls bidirectional chopper 2 in the normal state of commercial AC power supply 15 such that battery voltage VB becomes equal to a reference voltage VBR, and controls bidirectional chopper 2 in the power failure of commercial AC power supply 15 such that DC voltage VD of DC line DL becomes equal to reference voltage VDR.

Note that during the overload operation even in the normal state of commercial AC power supply 15, controller 6 controls bidirectional chopper 2 such that DC voltage VD of DC line DL becomes equal to reference voltage VDR.

Also, controller 6 controls bidirectional chopper 2 to charge battery 16 at a normal speed when battery voltage VB is not less than a lower-limit voltage VBL (VB≥VBL), and controls bidirectional chopper 2 to charge battery 16 at a speed higher than the normal speed when battery voltage VB is lower than lower-limit voltage VBL (VB<VBL). DC line DL is connected to a DC node 3a of inverter 3.

Inverter 3 is a well-known one including a plurality of transistors and a plurality of diodes and is controlled by controller 6. The circuit configuration of inverter 3 is identical to the circuit configuration of converter 1, and the capacity (i.e., size) of inverter 3 is identical to the capacity (i.e., size) of converter 1. Inverter 3 converts DC power received from DC line DL through DC node 3a into AC power of a commercial frequency and outputs the AC power to an AC node 3b. An output voltage of inverter 3 can be controlled to a desired value.

AC node 3b of inverter 3 is connected to one terminal (node N2) of switch S3 via reactor L3, and the other terminal of switch S3 is connected to AC output terminal T3. Capacitor C3 is connected between node N2 and neutral point NP.

Reactor L3 and capacitor C3 constitute an AC filter. This AC filter, which is a low-pass filter, passes the AC power of a commercial frequency generated in inverter 3 to AC output terminal T3 and prevents a signal of a switching frequency generated in inverter 3 from passing to AC output terminal T3.

Inverter 3, reactor L3, and capacitor C3 constitute a DC/AC converter 13 (second power converter), which converts DC power into AC power. The circuit configuration of DC/AC converter 13 is identical to the circuit configuration of AC/DC converter 11, and the capacity (i.e., size) of DC/AC converter 13 is identical to the capacity (i.e., size) of AC/DC converter 11.

Switch S3 is controlled by controller 6, is turned on, for example, while the uninterruptible power supply apparatus is operating, and is turned off, for example, while an operation of the uninterruptible power supply apparatus is stopped. An instantaneous value of an AC output voltage VO that appears at AC output terminal T3 is detected by controller 6.

Current detector CD3 detects a current Io flowing between inverter 3 and load 17 and provides a signal Iof, which indicates a detection value thereof, to controller 6. Controller 6 controls inverter 3 such that AC output voltage VO becomes equal to a sinusoidal reference voltage VOR.

Switch S4 is connected between AC input terminal T1 and an AC node N3 and is controlled by controller 6. Switch S4 is turned on during a high-speed charging operation for charging battery 16 at high speed while operating load 17, and is turned off during the other period.

Switch S5 is connected between AC node N3 and AC output terminal T3 and is controlled by controller 6. Switch S5 is turned on during a normal operation and during the overload operation. During the normal operation, rated power Pc of load 17 is supplied to load 17, and power higher than rated power Pc is supplied to load 17 during the overload operation. Switches S4, S5 are both turned off in a power failure of commercial AC power supply 15. Switches S4, S5 constitute an example of a switching circuit that connects AC node N3 to commercial AC power supply 15 or load 17.

DC line DL is also connected to a DC node 4a of converter 4. Converter 4 is a well-known one including a plurality of transistors and a plurality of diodes and is controlled by controller 6.

The circuit configuration of converter 4 is identical to the circuit configuration of each of converter 1 and inverter 3, and the capacity (i.e., size) of converter 4 is smaller than the capacity (i.e., size) of each of converter 1 and inverter 3. For example, assuming that the capacity of each of converter 1 and inverter 3 is 100%, the capacity of converter 4 is 50%.

An AC node 4b of converter 4 is connected to AC node N3 via reactor L4. Capacitor C4 is connected between AC node N3 and neutral point NP. Reactor L4 and capacitor C4 constitute an AC filter. The AC filter, which is a low-pass filter, passes AC power of a commercial frequency supplied from commercial AC power supply 15 or converter 4 and prevents a signal of a switching frequency generated in converter 4 from passing to AC node N3.

Converter 4, reactor L4, and capacitor C4 constitute a bidirectional converter 14 (fifth power converter), which selectively performs any conversion mode of an AC/DC mode of converting AC power supplied from commercial AC power supply 15 through AC node N3 into DC power and supplying the DC power to DC line DL, and a DC/AC conversion mode of converting DC power received from DC line DL into AC power and supplying the AC power through AC node N3 to load 17.

The circuit configuration of bidirectional converter 14 is identical to the circuit configuration of each of AC/DC converter 11 and DC/AC converter 13, and the capacity (i.e., size) of bidirectional converter 14 is smaller than the capacity (i.e., size) of each of AC/DC converter 11 and DC/AC converter 13. For example, assuming that the capacity of each of AC/DC converter 11 and DC/AC converter 13 is 100%, the capacity of bidirectional converter 14 is 50%. Switches S4, S5 and bidirectional converter 14 constitute an example fourth power converter.

An instantaneous value of an AC voltage VS that appears at AC node N3 is detected by controller 6. Current detector CD4 detects a current Is flowing through reactor L4 and provides a signal Isf, which indicates a detection value thereof, to controller 6.

During the high-speed charging operation, controller 6 controls converters 1, 4 such that DC voltage VD of DC line DL becomes equal to reference voltage VDR. At this time, the ratio between the output of converter 4 and the output of converter 1 is controlled to be equal to a ratio (e.g., 1/2) between the capacity of converter 4 and the capacity of converter 1.

During the overload operation, controller 6 controls converter 4 such that AC voltage VS that appears at AC node N3 becomes equal to sinusoidal reference voltage VOR. At this time, the ratio between the output of converter 4 and the output of inverter 3 is controlled to be equal to the ratio (e.g., 1/2) between the capacity of converter 4 and the capacity of inverter 3.

Operation unit 5 includes a plurality of buttons operated by the user of the uninterruptible power supply apparatus, an image display for displaying various types of information, and the like. As the user operates operation unit 5, for example, various voltages VDR, VBR, VOR, VBL can be set, the power supply of the uninterruptible power supply apparatus can be turned on and off, and the uninterruptible power supply apparatus can be operated automatically or operated manually.

Controller 6 also controls the entire uninterruptible power supply apparatus based on AC input voltage VI, AC input current Ii, DC voltage VD, battery voltage VB, battery current Ib, AC output voltage VO, AC output current Io, AC voltage VS, AC current Is, reference voltages VDR, VBR, VOR, lower-limit voltage VBL, a signal from operation unit 5, and the like.

Figure 2:
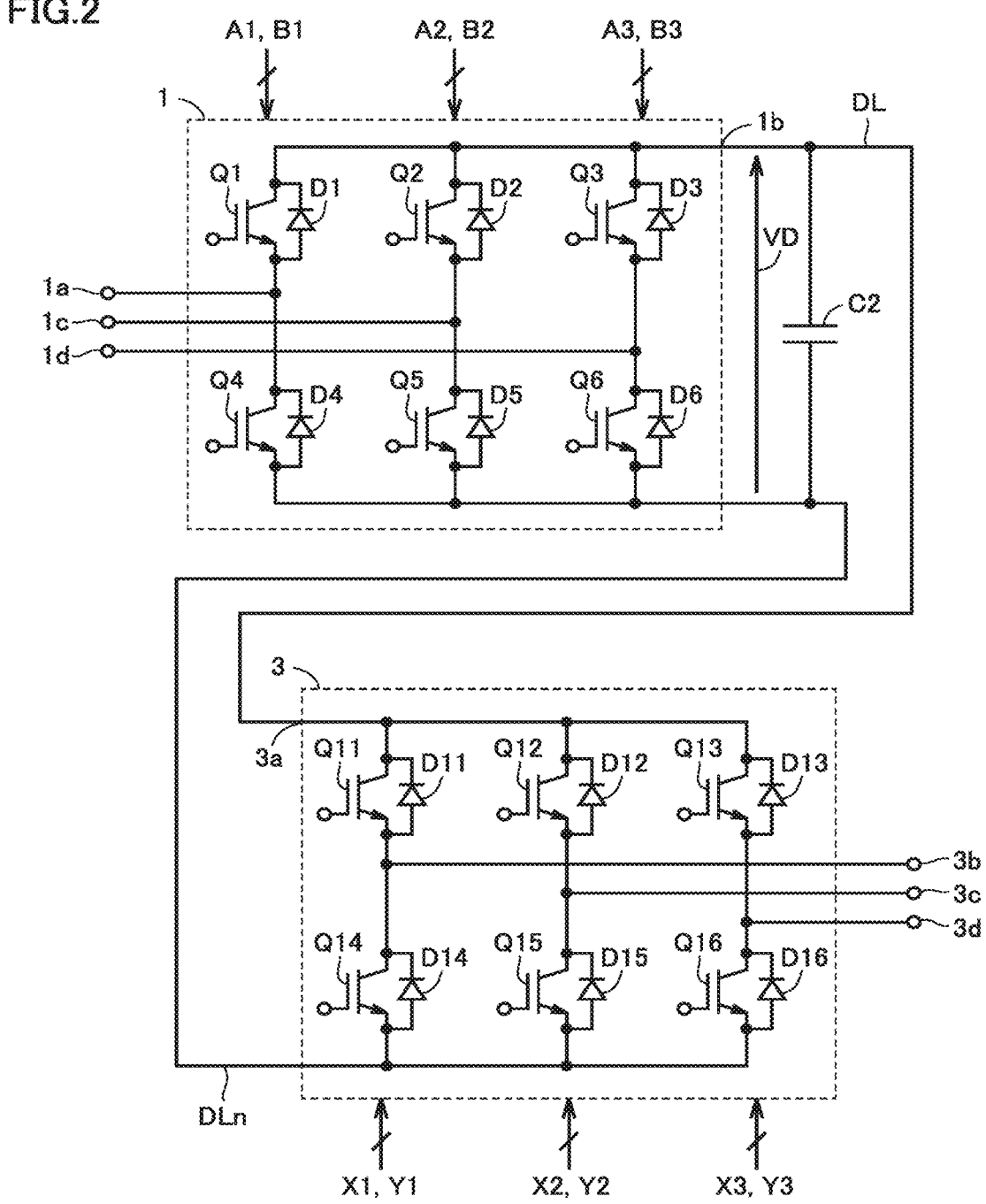
FIG. 2 is a circuit diagram showing configurations of a converter 1 and an inverter 3 shown in FIG. 1.

FIG. 2 is a circuit diagram showing configurations of converter 1 and inverter 3. Although FIG. 1 shows only a portion of the three-phase AC voltages which is related to a one-phase AC voltage, FIG. 2 shows a portion related to the three-phase AC voltages. Also, though FIG. 1 shows only DC line DL on the positive side, FIG. 2 shows a DC line DLn on the negative side as well.

In FIG. 2, converter 1 includes insulated gate bipolar transistors (IGBTs) Q1 to Q6 and diodes D1 to D6. The IGBT configures a switching element. IGBTs Q1 to Q3 have collectors connected together to DC line DL on the positive side via a DC node 1b, and emitters connected to AC nodes 1a, 1c, 1d, respectively.

AC nodes 1a, 1c, 1d are provided in correspondence with the respective three-phase AC voltages supplied from commercial AC power supply 15. IGBTs Q4 to Q6 have collectors connected to AC nodes 1a, 1c, 1d, respectively, and emitters connected together to DC line DLn on the negative side. Diodes D1 to D6 are connected in anti-parallel with IGBTs Q1 to Q6, respectively. Capacitor C2 is connected between DC lines DL, DLn.

IGBTs Q1, Q4 are controlled by gate signals A1, B1, respectively, IGBTs Q2, Q5 are controlled by gate signals A2, B2, respectively, and IGBTs Q3, Q6 are controlled by gate signals A3, B3, respectively. Gate signals B1, B2, B3 are inverted signals of gate signals A1, A2, A3, respectively.

IGBTs Q1 to Q3 are turned on when gate signals A1, A2, A3 are brought into the "H" level, respectively, and turned off when gate signals A1, A2, A3 are brought into the "L" level, respectively. IGBTs Q4 to Q6 are turned on when gate signals B1, B2, B3 are brought into the "H" level, respectively, and turned off when gate signals B1, B2, B3 are brought into the "L" level, respectively.

Each of gate signals A1, B1, A2, B2, A3, B3 is a pulse signal sequence, which is a pulse width modulation (PWM) signal. Gate signals A1, B1, gate signals A2, B2, and gate signals A3, B3 are basically 120° out of phase with each other. Gate signals A1, B1, A2, B2, A3, B3 are generated by controller 6.

As IGBTs Q1 to Q6 are turned on and off at predetermined timings by gate signals A1, B1, A2, B2, A3, B3, respectively, and the respective ON times of IGBTs Q1 to Q6 are adjusted, three-phase AC voltages provided to AC nodes 1a, 1c, 1d can be converted into a desired DC voltage VD (a terminal-to-terminal voltage of capacitor C2).

Inverter 3 includes IGBTs Q11 to Q16 and diodes D11 to D16. The IGBT configures a switching element. IGBTs Q11 to Q13 have collectors connected together to DC line DL on the positive side via DC node 3a, and emitters connected to AC nodes 3b, 3c, 3d, respectively.

AC nodes 3b, 3c, 3d are provided in correspondence with the respective three-phase AC voltages supplied to load 17. IGBTs Q14 to Q16 have collectors connected to AC nodes 3b, 3c, 3d, respectively, and emitters connected together to DC line DLn on the negative side. Diodes D11 to D16 are connected in anti-parallel with IGBTs Q11 to Q16, respectively.

IGBTs Q11, Q14 are controlled by gate signals X1, Y1, respectively, IGBTs Q12, Q15 are controlled by gate signals X2, Y2, respectively, and IGBTs Q13, Q16 are controlled by gate signals X3, Y3, respectively. Gate signals Y1, Y2, Y3 are inverted signals of gate signals X1, X2, X3, respectively.

IGBTs Q11 to Q13 are turned on when gate signals X1, X2, X3 are brought into the "H" level, respectively, and turned off when gate signals X1, X2, X3 are brought into the "L" level, respectively. IGBTs Q14 to Q16 are turned on when gate signals Y1, Y2, Y3 are brought into the "H" level, respectively, and are turned off when gate signals Y1, Y2, Y3 are brought into the "L" level, respectively.

Each of gate signals X1, Y1, X2, Y2, X3, Y3 is a pulse signal sequence, which is a PWM signal. Gate signals X1, Y1, gate signals X2, Y2, and gate signals X3, Y3 are basically 120° out of phase with each other. Gate signals X1, Y1, X2, Y2, X3, Y3 are generated by controller 6.

For example, when IGBTs Q11, Q15 are turned on, DC line DL is connected to AC node 3b via IGBT Q11, and AC node 3c is connected to DC line DLn via IGBT Q15, so that a positive voltage is output between AC nodes 3b, 3c.

When IGBTs Q12, Q14 are turned on, DC line DL is connected to AC node 3c via IGBT Q12, and AC node 3b is connected to DC line DLn via IGBT Q14, so that a negative voltage is output between output nodes 3b, 3c.

As IGBTs Q11 to Q16 are turned on and off at predetermined timings by gate signals X1, Y1, X2, Y2, X3, Y3, respectively, and the respective ON times of IGBTs Q11 to Q16 are adjusted, DC voltage VD between DC lines DL, DLn can be converted into three-phase AC voltages.

Figure 3:
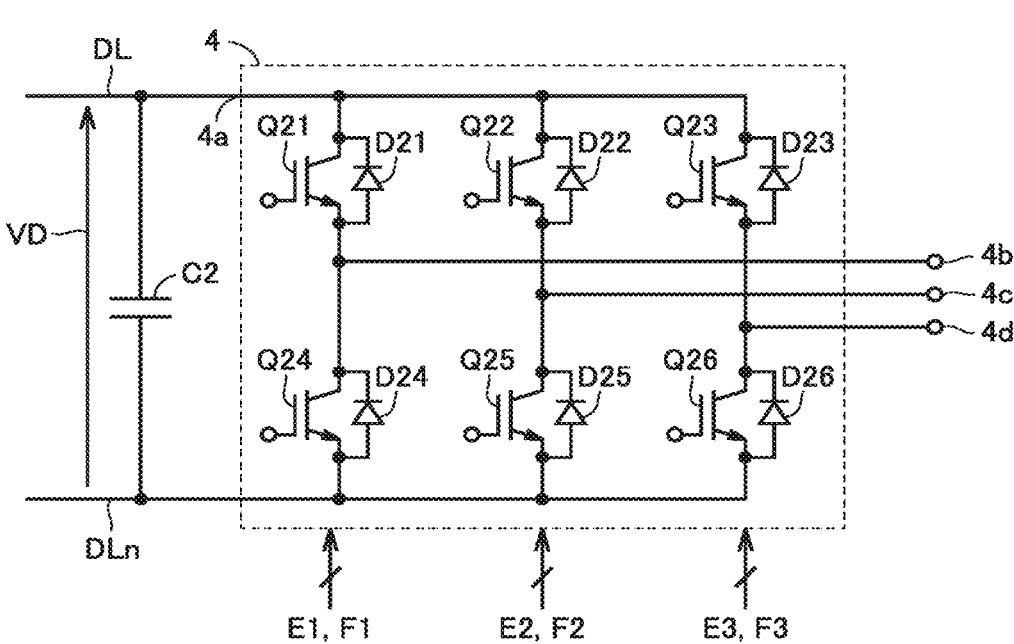
FIG. 3 is a circuit diagram showing a configuration of a converter 4 included in a bidirectional converter shown in FIG. 1.

FIG. 3 is a circuit diagram showing a configuration of converter 4 included in bidirectional converter 14. Although FIG. 1 shows only a portion of the three-phase AC voltages which is related to a one-phase AC voltage, FIG. 3 shows a portion related to three-phase AC voltages. Also, though FIG. 1 shows only DC line DL on the positive side, FIG. 3 shows DC line DLn on the negative side as well.

In FIG. 3, converter 4 includes IGBTs Q21 to Q26 and diodes D21 to D26. The IGBT configures a switching element. IGBTs Q21 to Q23 have collectors connected together to DC line DL on the positive side via DC node 4a, and emitters connected to AC nodes 4b, 4c, 4d, respectively.

AC nodes 4b, 4c, 4d are provided in correspondence with the respective three-phase AC voltages. IGBTs Q24 Q26 have collectors connected to AC nodes 4b, 4c, 4d, respectively, and emitters connected together to DC line DLn on the negative side. Diodes D21 to D26 are connected in anti-parallel with IGBTs Q21 to Q26, respectively. Capacitor C2 is connected between DC lines DL, DLn.

IGBTs Q21, Q24 are controlled by gate signals E1, F1, respectively, IGBTs Q22, Q25 are controlled by gate signals E2, F2, respectively, and IGBTs Q23, Q26 are controlled by gate signals E3, F3, respectively. Gate signals F1, F2, F3 are inverted signals of gate signals E1, E2, E3, respectively.

IGBTs Q21 to Q23 are turned on when gate signals E1, E2, E3 are brought into the "H" level, respectively, and are turned off when gate signals E1, E2, E3 are brought into the "L" level, respectively. IGBTs Q24 to Q26 are turned on when gate signals F1, F2, F3 are brought into the "H" level and are turned off when gate signals F1, F2, F3 are brought into the "L" level, respectively.

Each of gate signals E1, F1, E2, F2, E3, F3 is a pulse signal sequence, which is a PWM signal. Gate signals E1, F1, gate signals E2, F2, and gate signals E3, F3 are basically 120° out of phase with each other. Gate signals E1, F1, E2, F2, E3, F3 are generated by controller 6.

During the high-speed charging operation, as IGBTs Q21 to Q26 are turned on and off at predetermined timings by gate signals E1, F1, E2, F2, E3, F3, respectively, and the respective ON times of IGBTs Q21 to Q26 are adjusted, three-phase AC voltages provided from commercial AC power supply 15 to AC nodes 4*b*, 4*c*, 4*d* can be converted into a desired DC voltage VD (a terminal-to-terminal voltage of capacitor C2).

During the overload operation, as IGBTs Q21 to Q26 are turned on and off at predetermined timings by gate signals E1, F1, E2, F2, E3, F3, respectively, and the respective ON times of IGBTs Q21 to Q26 are adjusted, DC voltage VD between DC lines DL, DLn can be converted into three-phase AC voltages.

As shown in FIGS. 2 and 3, the circuit configuration of converter 1, the circuit configuration of inverter 3, and the circuit configuration of converter 4 are identical to each other. Also, the capacity (i.e., size) of converter 1 is designed to be equal to the capacity (i.e., size) of inverter 3 as in a conventional uninterruptible power supply apparatus.

Also, the capacity (i.e., size) of converter 4 is smaller than the capacity (i.e., size) of each of converter 1 and inverter 3. For example, assuming that the capacity (i.e., size) of each of converter 1 and inverter 3 is 100%, the capacity (i.e., size) of converter 4 is 50%.

As described above, as converters 1, 4 have the same circuit configuration and the capacity of converter 4 is 50% of the capacity of converter 1, during the high-speed charging operation, converters 1, 4 can operate in cooperation with each other, and converters 1, 4 can be controlled easily such that the output of converter 4 becomes 50% of the output of converter.

Also, as converter 4 and inverter 3 have the same circuit configuration and the capacity of converter 4 is 50% of the capacity of inverter 3, during the overload operation, converter 4 and inverter 3 can operate in cooperation with each other, and converter 4 and inverter 3 can be controlled easily such that the output of converter 4 becomes 50% of the output of inverter 3.

Figure 4:
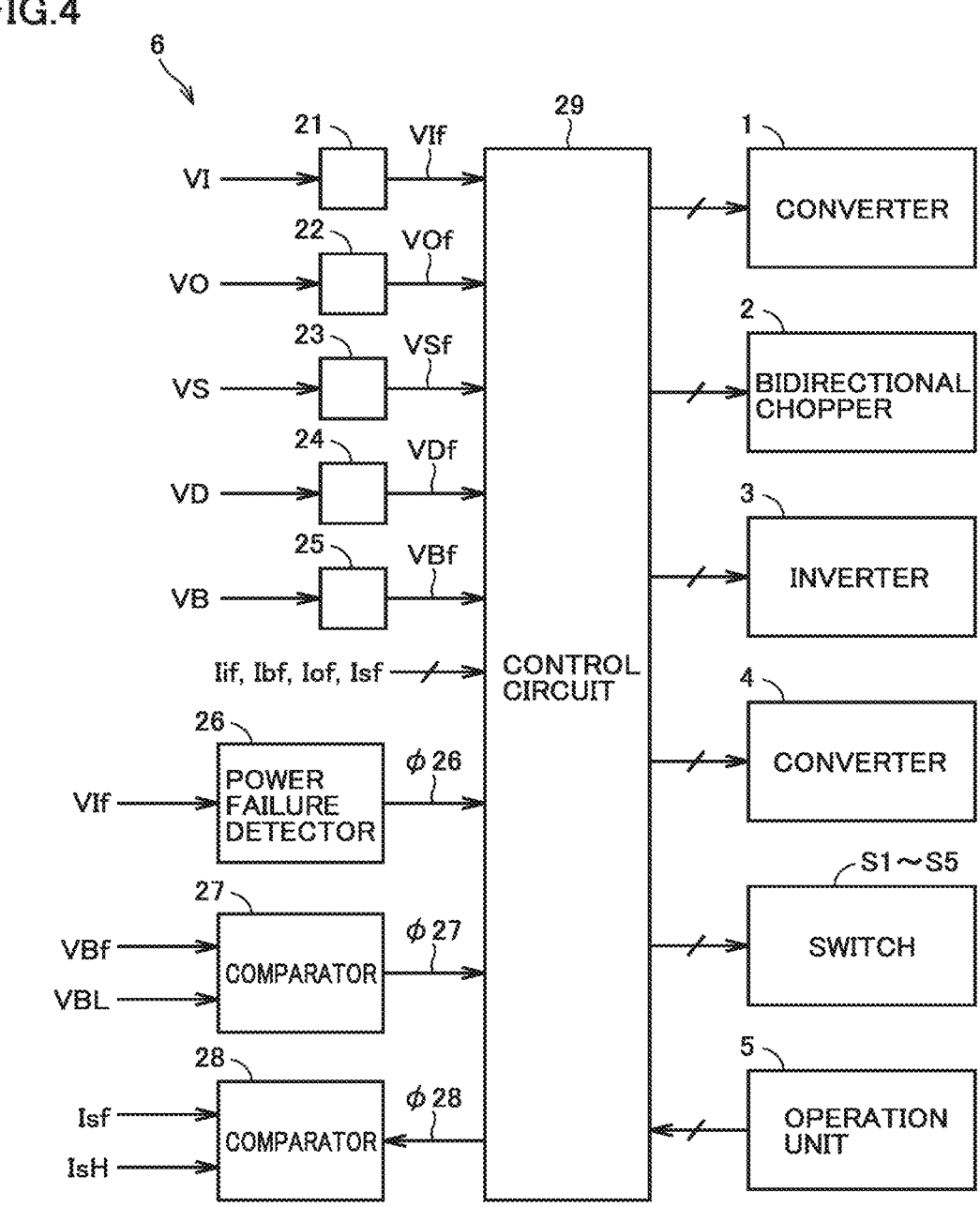
FIG. 4 is a block diagram showing a configuration of a controller shown in FIG. 1.

FIG. 4 is a block diagram showing main portions of controller 6. In FIG. 4, controller 6 includes voltage detectors 21 to 25, a power failure detector 26, comparators 27, 28, and a control circuit 29.

Voltage detector 21 detects an instantaneous value of AC input voltage VI that is supplied from commercial AC power supply 15 and outputs a signal VIf, which indicates a detection value thereof, to power failure detector 26 and control circuit 29. Voltage detector 22 detects an instantaneous value of AC output voltage VO supplied to load 17 and outputs a signal VOf, which indicates a detection value thereof, to control circuit 29. Voltage detector 23 detects an instantaneous value of AC voltage VS that appears at AC node N3 and outputs a signal VSf, which indicates a detection value thereof, to control circuit 29.

Voltage detector 24 detects an instantaneous value of DC voltage VD of DC line DL and outputs a signal VDf, which indicates a detection value thereof, to control circuit 29. Voltage detector 25 detects an instantaneous value of terminal-to-terminal voltage VB of battery 16 and outputs a signal VBf, which indicates a detection value thereof, to control circuit 29. Output signals Iif, Ibf, Iof, Isf of current detectors CD1 to CD4 (FIG. 1) are provided to control circuit 29.

Power failure detector 26 detects whether a power failure has occurred in commercial AC power supply 15 based on signal VIf output from voltage detector 21 and outputs a signal φ26, which indicates a detection result thereof, to control circuit 29. When commercial AC power supply 15 is in the normal state, signal φ26 is brought into the "H" level. When a power failure has occurred in commercial AC power supply 15, signal φ26 is brought into the "L" level.

For example, when AC input voltage VI is higher than a lower limit, power failure detector 26 determines that commercial AC power supply 15 is in the normal state, and brings signal φ26 into the "H" level. When AC input voltage VI is lower than the lower limit, power failure detector 26 determines that a power failure has occurred in commercial AC power supply 15, and brings signal φ26 into the "L" level.

Comparator 27 compares the magnitude between battery voltage VB indicated by signal VBf and lower-limit voltage VBL, and provides a signal φ27, which indicates a comparison result, to control circuit 29. When battery voltage VB is not less than lower-limit voltage VBL (VB≥VBL), signal φ27 is brought into the "H" level.

When DC voltage VB is lower than lower-limit voltage VBL (VBL>VB), signal φ27 is brought into the "L" level. Signal φ27 being at the "L" level is a condition for performing a high-speed charging operation of battery 16. When signal φ27 is at the "H" level, the high-speed charging operation of battery 16 is not performed.

Comparator 28 compares the magnitude between AC output current Is of converter 4 which is indicated by signal Isf and an upper-limit current IsH, and provides a signal φ28, which indicates a comparison result, to control circuit 29. When AC output current Is of converter 4 is not greater than upper-limit current IsH (Is≤IsH), signal φ28 is brought into the "L" level.

When AC output current Is of converter 4 exceeds upper-limit current IsH (Is>IsH), signal φ28 is brought into the "H" level. Signal φ28 being at the "H" level is a condition for performing the overload operation. When signal φ28 is at the "L" level, the overload operation is not performed.

For example, when the ratio between the capacity of converter 4 and the capacity of inverter 3 is 1/2 and AC output current Is of converter 4 is controlled to be 1/2 of AC output current Io of inverter 3, upper-limit current IsH is set to a value that is one third of a rated current Ic of load 17.

When AC output current Is of converter 4 becomes equal to upper-limit current IsH=Ic/3, AC output current Iof of inverter 3 is two-thirds of rated current Ic of load 17, and rated current Ic is supplied from converter 4 and inverter 3 to load 17. In this case, signal φ28 is brought into the "L" level, and the overload operation is not performed.

When AC output current Is of converter 4 exceeds upper-limit current IsH=Ic/3, AC output current Iof of inverter 3 becomes greater than two-thirds of rated current Ic of load 17, and a current larger than rated current Ic is supplied from converter 4 and inverter 3 to load 17. In this case, signal φ28 is brought into the "H" level, and the overload operation is performed.

Figure 5:
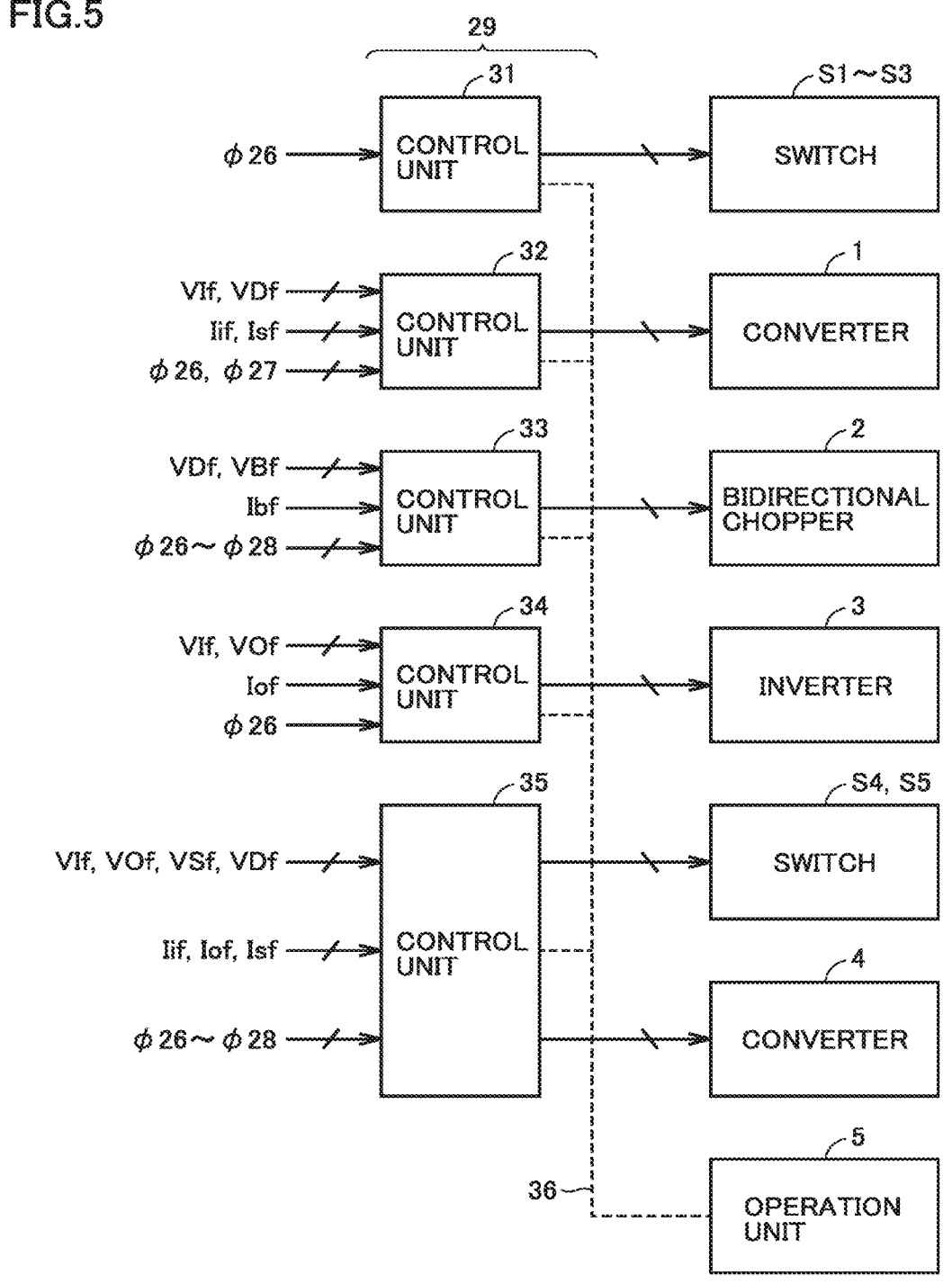
FIG. 5 is a block diagram showing a configuration of a control circuit shown in FIG. 4.

FIG. 5 is a block diagram showing main portions of control circuit 29. In FIG. 5, control circuit 29 includes control units 31 to 35 and a communication line 36. Control units 31 to 35 and operation unit 5 are connected to one another by communication line 36. Control units 31 to 35 provide and receive various signals through communication line 36 and control the entire uninterruptible power supply apparatus in cooperation with one another.

Control unit 31 controls switches S1 to S3 based on signal φ26 output from power failure detector 26 and the signal from operation unit 5. When signal φ26 is at the "H" level (in the normal state of commercial AC power supply 15), control unit 31 turns on switches S1 to S3.

When signal φ26 is at the "L" level (in a power failure of commercial AC power supply 15), control unit 31 turns off switch S1 and maintains switches S2, S3 in the ON state. Also, control unit 31 individually turns on and off switches S1 to S3 during a manual operation according to the signal from operation unit 5.

Control unit 32 generates gate signals A1 to A3, B1 to B3 (FIG. 2) based on signals VIf, VDf output from voltage detectors 21, 24, signals Iif, Isf output from current detectors CD1, CD4, signals φ26, φ27 output from power failure detector 26 and comparator 27, and the signal from operation unit 5, and controls converter 1.

When signals φ26, φ27 are both at the "H" level (during the normal operation and during the overload operation), control unit 32 controls converter 1 based on signals VIf, VDf, Iif such that DC voltage VD of DC line DL becomes equal to reference voltage VDR.

When signal φ26 is at the "L" level (in a power failure of commercial AC power supply 15), control unit 32 stops an operation of converter 1. At this time, gate signals A1 to A3, B1 to B3 are brought into the "L" level together to turn off IGBTs Q1 to Q6 (FIG. 2) of converter 1.

When signals φ26, φ27 are at the "H" level and the "L" level, respectively (during the high-speed charging operation), control unit 32 operates in cooperation with control unit 35 and controls converter 1 based on signals VIf, VDf, Iif, Isf such that DC voltage VD of DC line DL becomes equal to reference voltage VDR.

At this time, converter 1 is controlled such that the ratio (Is/Ii) between current Is flowing through converter 4 and current Ii flowing through converter 1 becomes equal to the ratio (e.g., 1/2) between the capacity of converter 4 and the capacity of converter 1. Control unit 32 starts or stops converter 1 during the manual operation according to the signal from operation unit 5.

Control unit 33 controls bidirectional chopper 2 based on signals VDf, VBf output from voltage detectors 24, 25, signal Ibf output from current detector CD2, signals φ26, φ27, φ28 output from power failure detector 26 and comparators 27, 28, and the signal from operation unit 5.

When signals φ26, φ27, φ28 are at the "H" level, "H" level, and "L" level, respectively (during the normal operation), control unit 33 controls bidirectional chopper 2 based on signals VBf, Ibf such that battery voltage VB becomes equal to reference voltage VBR.

When signals φ26, φ27, φ28 are at the "H" level, "L" level, and "L" level, respectively (during the high-speed charging operation), control unit 33 controls bidirectional chopper 2 based on signals VBf, Ibf such that battery voltage VB becomes equal to reference voltage VBR.

Herein, control unit 33 controls bidirectional chopper 2 to charge battery 16 at a normal speed during the normal operation and controls bidirectional chopper 2 to charge battery 16 at a speed higher than the normal speed during the high-speed charging operation.

For example, during the normal operation, control unit 33 controls bidirectional chopper 2 such that a current Ib=K1× (VBR−VB) having a value, which is obtained by multiplying a difference ΔVB=VBR−VB between reference voltage VBR and battery voltage VB by a gain K1, flows from DC line DL to battery 16, where K1 is a positive real number.

Also, control unit 33 controls bidirectional chopper 2 such that during the high-speed charging operation, a current Ib=K2×(VBR−VB) having a value, which is obtained by multiplying a difference ΔVB=VBR−VB between reference voltage VBR and battery voltage VB by a gain K2, flows from DC line DL to battery 16, where K2 is a positive real number greater than K1.

Thus, during the high-speed charging operation, a large charging current can be flowed through battery 16 to charge battery 16 at a speed higher than during the normal operation.

When signals φ26, φ27, φ28 are at the "H" level (during the overload operation), control unit 33 controls bidirectional chopper 2 based on signals VDf, Ibf such that DC voltage VD of DC line DL becomes equal to reference voltage VDR.

When signal φ26 is at the "L" level (in a power failure of commercial AC power supply 15), control unit 33 controls bidirectional chopper 2 based on signals VBf, Ibf such that DC voltage VD of DC line DL becomes equal to reference voltage VDR. Also, control unit 33 starts or stops bidirectional chopper 2 during the manual operation according to the signal from operation unit 5.

Based on signals VIf, VOf output from voltage detectors 21, 22, signal Iof output from current detector CD3, signal φ26 output from power failure detector 26, and the signal from operation unit 5, control unit 34 generates gate signals X1 to X3, Y1 to Y3 (FIG. 2) and controls inverter 3.

When signal φ26 is at the "H" level (in the normal state of commercial AC power supply 15), control unit 34 operates in cooperation with control unit 35, operates in synchronization with signal VIf, and controls inverter 3 based on signals VOf, Iof such that AC output voltage VO becomes equal to sinusoidal reference voltage VOR.

At this time, inverter 3 is controlled such that the ratio (Is/Io) between current Is flowing through converter 4 and current Io flowing through inverter 3 becomes equal to the ratio (e.g., 1/2) between the capacity of converter 4 and the capacity of inverter 3.

When signal φ26 is at the "L" level (in a power failure of commercial AC power supply 15), control unit 34 operates in synchronization with signal VIf and controls inverter 3 based on signals VOf, Iof such that AC output voltage VO becomes equal to sinusoidal reference voltage VOR.

Based on signals VIf, VOf, VSf, VDf output from voltage detectors 21 to 24, signals Iif, Iof, Isf output from current detectors CD1, CD3, CD4, signals φ26, φ27, φ28 output from power failure detector 26 and comparators 27, 28, and the signal from operation unit 5, control unit 35 controls switches S4, S5, and also, generates gate signals E1 to E3, F1 to F3 (FIG. 3) and controls converter 4.

When signals φ26, φ27, φ28 are at the "H" level, "L" level, and "L" level, respectively (during the high-speed charging operation), control unit 35 turns on switch S4 and turns off switch S5 to connect bidirectional converter 14 to AC/DC converter 11 in parallel. Control unit 35 also operates in cooperation with control unit 22 and controls converter 4 such that DC voltage VD of DC line DL becomes equal to reference voltage VDR.

At this time, converter 4 is controlled such that the ratio (Is/Ii) between current Is flowing through converter 4 and current Ii flowing through converter 1 becomes equal to the ratio (e.g., 1/2) between the capacity of converter 4 and the capacity of converter 1.

When signals φ26, φ27 are at the "H" level (during the normal operation and during the overload operation), irrespective of the logic level of signal φ28, control unit 35 turns off switches S4, S5, controls converter 4 to cause AC voltage VS to be equal to AC output voltage VO and then turns on switch S5 to connect bidirectional converter 14 to DC/AC converter 13 in parallel. Control unit 35 also operates in cooperation with control unit 24, and controls converter 4 such that AC voltage VS becomes equal to sinusoidal reference voltage VOR.

At this time, converter 4 is controlled such that the ratio (Is/Io) between current Is flowing through converter 4 and current Io flowing through inverter 3 becomes equal to the ratio (e.g., 1/2) between the capacity of converter 4 and the capacity of inverter 3.

When signal φ26 is at the "L" level (in a power failure of commercial AC power supply 15), control unit 35 turns off switches S4, S5 to electrically isolate AC node N3 from commercial AC power supply 15 and load 17.

Control unit 35 also turns on and off each of switches S4, S5 according to the signal from operation unit 5 to operate or stop converter 4. For example, the user of the uninterruptible power supply apparatus can operate operation unit 5 to perform any one of the high-speed charging operation and the overload operation.

When high-speed charging is performed but the overload operation is not performed, switch S5 is fixed in the OFF state, and converter 4 performs only the AC/DC conversion operation. In contrast, when the overload operation is performed but high-speed charging is not performed, switch S4 is fixed in the OFF state, and converter 4 performs only the DC/AC conversion operation.

The user of the uninterruptible power supply apparatus operates operation unit 5 to stop the operation of converter 4 to turn off switch S3 and turn on switches S4, S5, thereby supplying AC power from commercial AC power supply 15 through switches S4, S5 to load 17.

Figure 6:
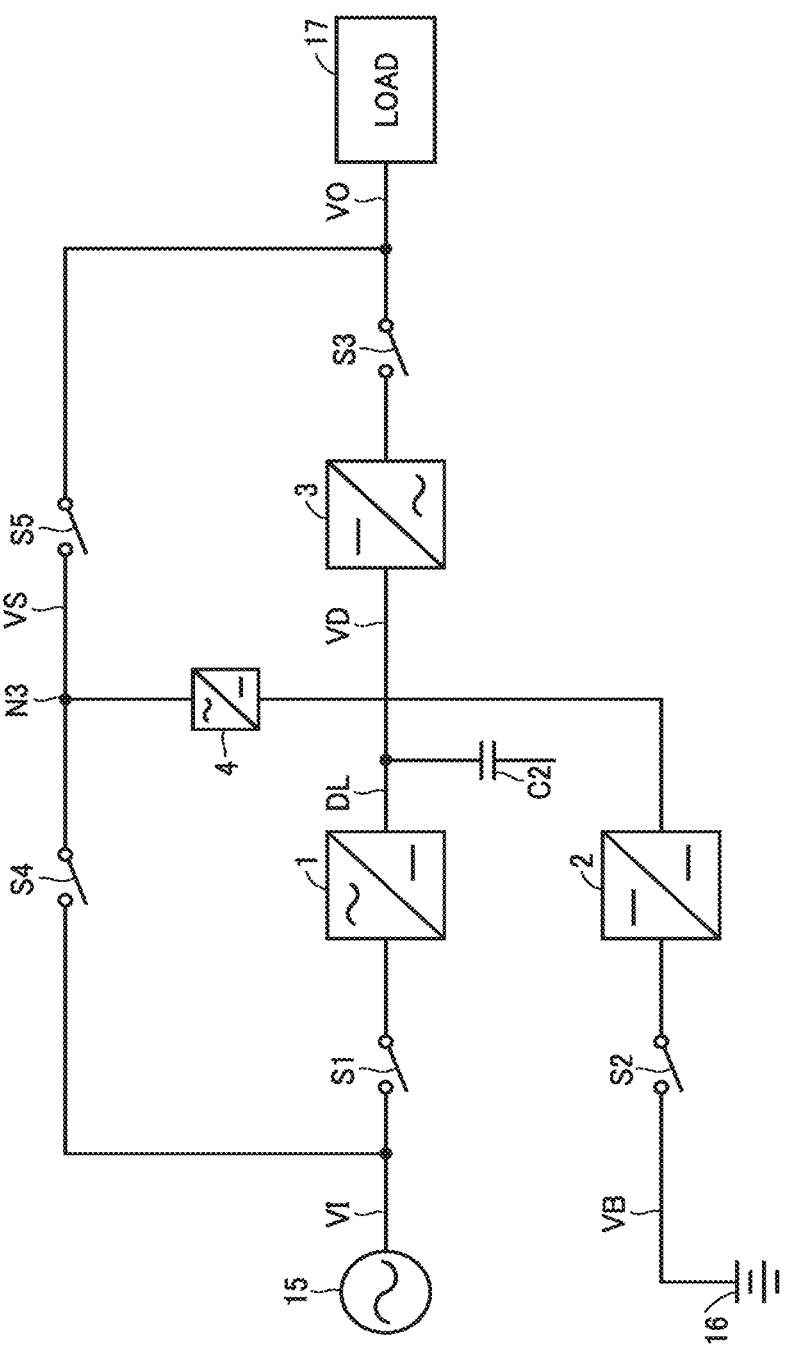
FIG. 6 is a circuit block diagram for describing an operation of the uninterruptible power supply apparatus at startup.

Next, an operation of the uninterruptible power supply apparatus will be described. FIG. 6 is a circuit block diagram for describing an operation of the uninterruptible power supply apparatus at startup. In FIG. 6, terminals T1 to T3, capacitors C1, C3, C4, reactors L1 to L4, current detectors CD1 to CD4, operation unit 5, and controller 6 (FIG. 1) are not shown for simplicity of the drawings and description.

The capacity of converter 1, the capacity of bidirectional chopper 2, and the capacity of inverter 3 are set to the same value, and the ratio between the capacity of converter 4, and the capacity of each of converter 1, bidirectional chopper 2, and inverter 3 is set to 1/2. Thus, converter 1, bidirectional chopper 2, and inverter 3 are indicated by blocks of the same size, and converter 4 is indicated by a block smaller than these blocks.

Before startup, terminal-to-terminal voltage VB of battery 16 falls below lower-limit voltage VBL, and signal φ27 output from comparator 27 (FIG. 4) is brought into the "L" level. Also, at startup, commercial AC power supply 15 is in the normal state, and signal φ26 output from power failure detector 26 is brought into the "H" level.

When start of the uninterruptible power supply apparatus is instructed using operation unit 5 (FIGS. 1 and 5), capacitor C2 is preliminarily charged to a predetermined voltage by a preliminary charging circuit (not shown), and then, switch S1 is turned on by control unit 31 (FIG. 5), and an operation of converter 1 is started by control unit 32 (FIG. 5). Converter 1 converts AC power supplied from commercial AC power supply 15 through switch S1 into DC power and supplies the DC power to DC line DL.

Subsequently, switch S4 is turned on by control unit 35 (FIG. 5), and an operation of converter 4 is started. At this time, in order to prevent an inrush current from flowing from commercial AC power supply 15 to converters 1, 4, switch S4 is turned on after a lapse of a predetermined time from turning-on of switch S1. Converter 4 operates in cooperation with converter 1, and converts the AC power supplied from commercial AC power supply 15 through switch S4 into DC power and supplies the DC power to DC line DL.

Subsequently, an operation of inverter 3 is started by control unit 34 (FIG. 5), and switch S3 is turned on by control unit 31. Inverter 3 converts the DC power received from DC line DL into AC power and supplies the AC power to load 17 through switch S3.

Subsequently, switch S2 is turned on by control unit 31, and an operation of bidirectional chopper 2 is started by control unit 33 (FIG. 5). Thus, a current is flowed from DC line DL through bidirectional chopper 2 and switch S2 to battery 16, so that high-speed charging of battery 16 is started.

Figure 7:
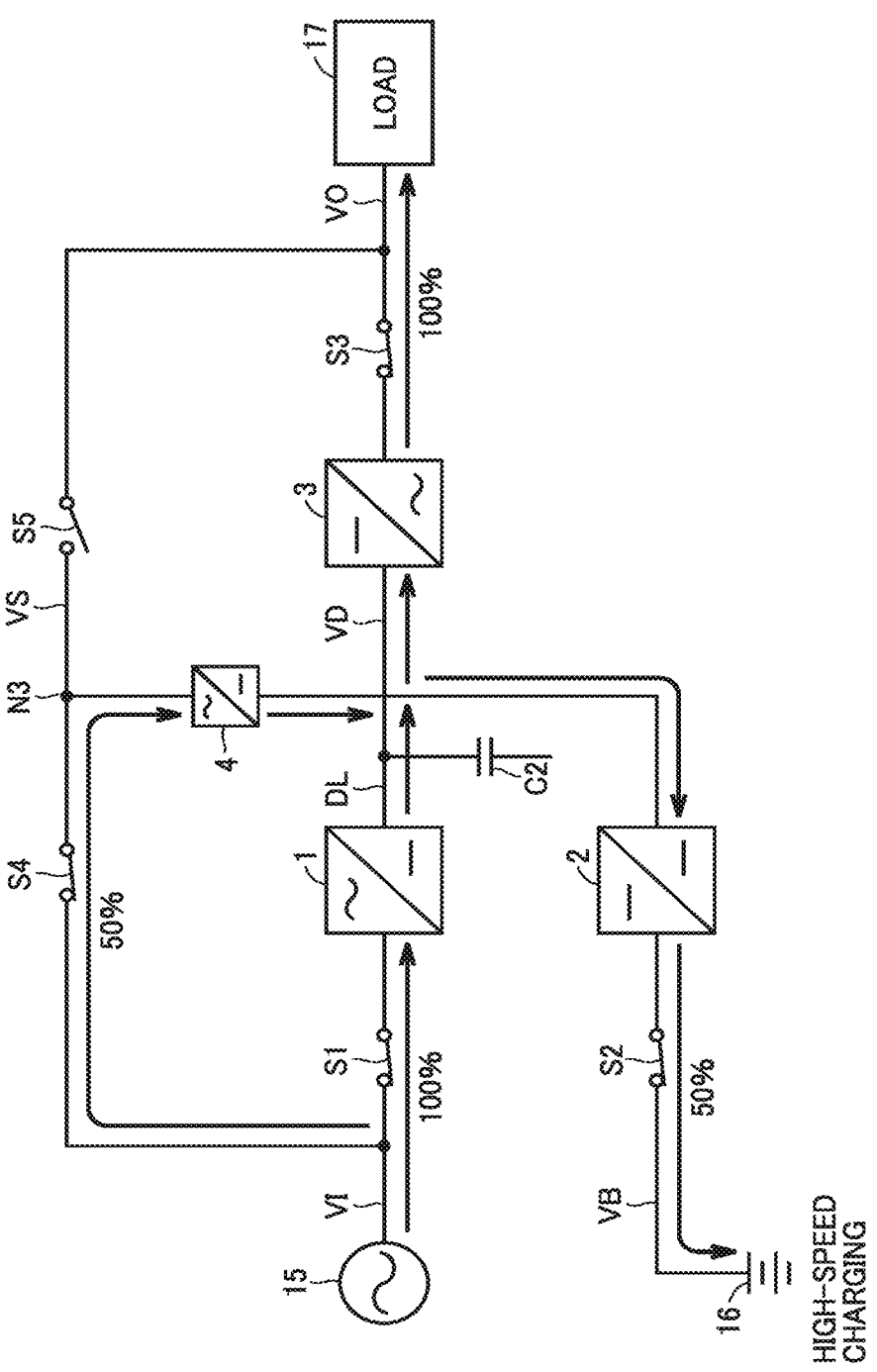
FIG. 7 is a circuit block diagram for describing an operation of the uninterruptible power supply apparatus during a high-speed charging operation.

FIG. 7 is a circuit block diagram for describing an operation of the uninterruptible power supply apparatus during the high-speed charging operation. In FIG. 7, the arrows indicate a path through which power is supplied. AC power supplied from commercial AC power supply 15 is converted into DC power by converters 1, 4, and the DC power is supplied to DC line DL. The DC power supplied to DC line DL is stored in battery 16 through bidirectional chopper 2 and is converted into AC power by inverter 3, and the AC power is supplied to load 17.

During the high-speed charging operation, control units 32, 35 operate in cooperation with each other and control converters 1, 4 such that the ratio (Is/Ii) between current Is flowing through converter 4 and current Ii flowing through converter 1 becomes equal to the ratio (herein, 1/2) between the capacity of converter 4 and the capacity of converter 1.

Thus, assuming that rated power Pc of load 17 is 100%, as shown in FIG. 7, 150% DC power can be generated by converters 1, 4, and 50% DC power can be supplied to battery 16 while 100% AC power is being supplied to load 17 by inverter 3.

When battery voltage VB rises and exceeds lower-limit voltage VBL, signal φ27 output from comparator 27 (FIG. 4) is brought into the "H" level. When signal φ27 is brought into the "H" level, an operation of converter 4 is temporarily stopped by control unit 35 to turn off switch S4.

Then, an operation of converter 4 is started by control unit 35, and converter 4 is controlled such that AC voltage VS of AC node N3 becomes equal to AC output voltage VO. When AC voltage VS becomes equal to AC output voltage VO, switch S5 is turned on by control unit 35, and inverter 3 and converter 4 are operated in parallel by control units 32, 35.

At this time, converter 4 operates in cooperation with inverter 3, converts the DC power received from DC line DL into AC power, and supplies the AC power through switch S5 to load 17. Control units 34, 35 operate in cooperation with each other, and control inverter 3 and converter 4 such that the ratio (Is/Io) between current Is output from converter 4 and current Io output from inverter 3 becomes equal to the ratio (herein, 1/2) between the capacity of converter 4 and the capacity of inverter 3.

Figure 8:
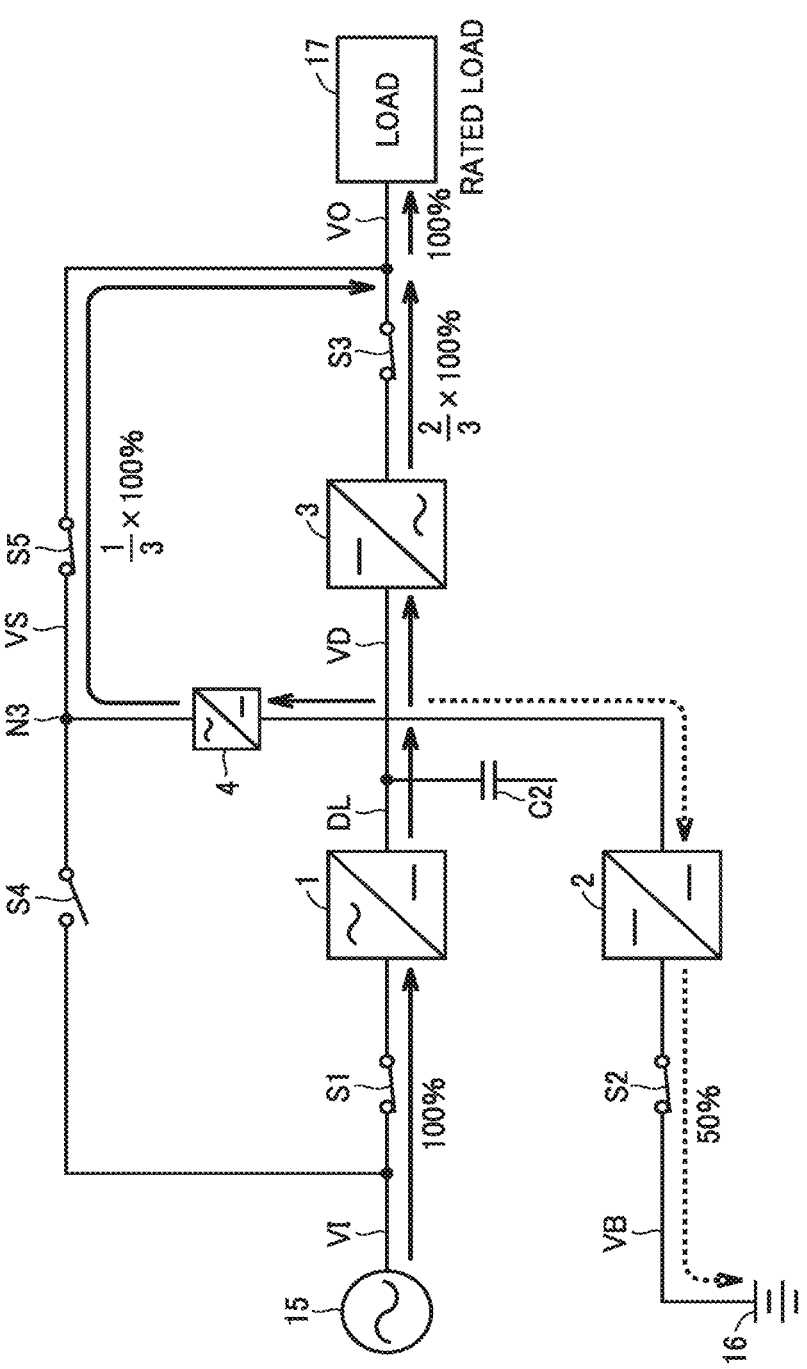
FIG. 8 is a circuit block diagram for describing an operation of the uninterruptible power supply apparatus during a normal operation.

During the normal operation in which load 17 is operated with rated power Pc, bidirectional chopper 2 is controlled by control unit 33 such that battery voltage VB becomes equal to reference voltage VBR. FIG. 8 is a circuit block diagram for describing an operation of the uninterruptible power supply apparatus during the normal operation.

In FIG. 8, the AC power supplied from commercial AC power supply 15 is converted into DC power by converter 1, and the DC power is supplied to DC line DL. The DC power supplied to DC line DL is stored in battery 16 through bidirectional chopper 2 and is converted into AC power by inverter 3 and converter 4, and the AC power is supplied to load 17.

Assuming that rated power Pc of load 17 is 100%, as shown in FIG. 8, 100% AC power is supplied from commercial AC power supply 15 to converter 1, 100% DC power is supplied from converter 1 to DC line DL, (2/3)× 100% AC power is supplied from inverter 3 to load 17, and (1/3)×100% AC power is supplied from converter 4 to load 17. Note that battery voltage VB has reached reference voltage VBR and DC power supplied from bidirectional chopper 2 to battery 16 is sufficiently small.

Figure 9:
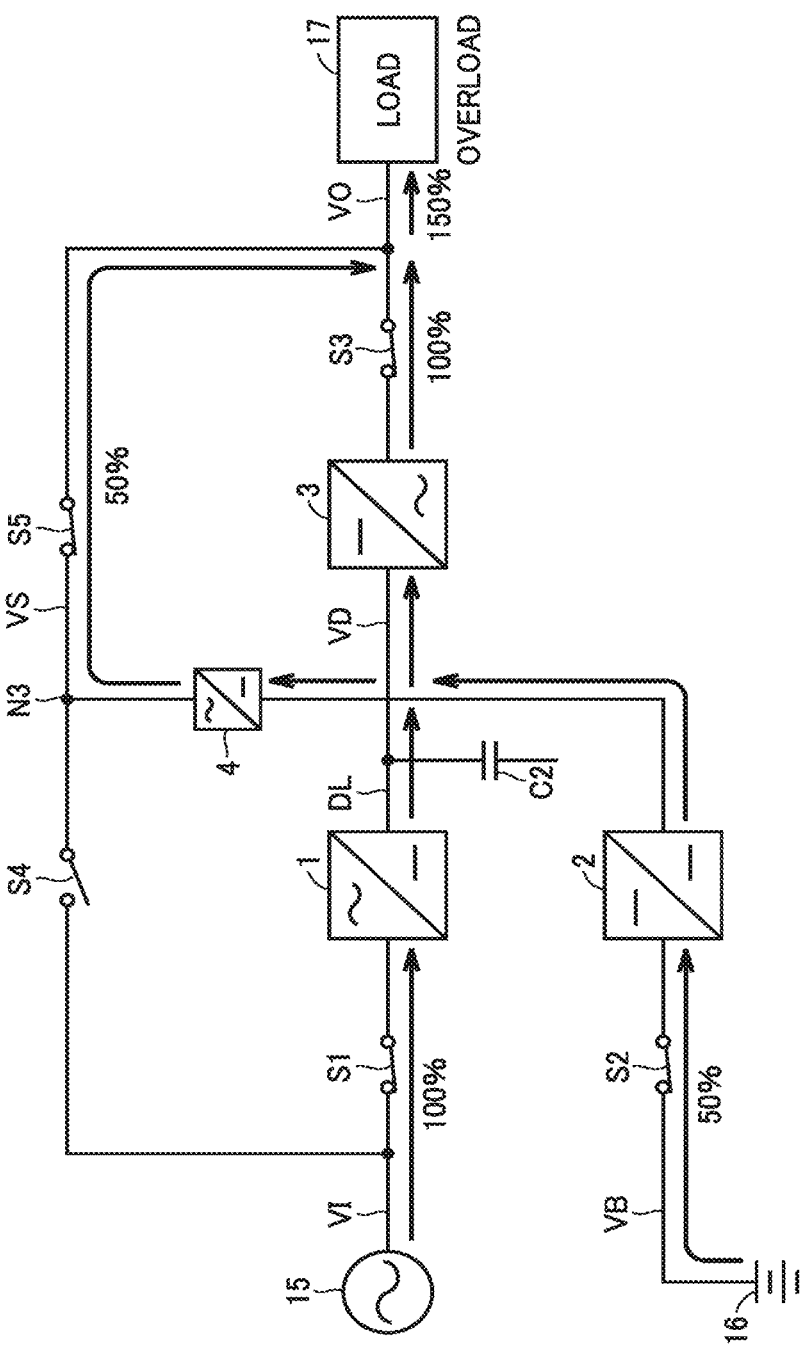
FIG. 9 is a circuit block diagram for describing an operation of the uninterruptible power supply apparatus during an overload operation.

Also, during the overload operation in which load 17 is operated with power larger than rated power Pc, bidirectional chopper 2 is controlled by control unit 33 such that DC voltage VD of DC line DL becomes equal to reference voltage VDR. FIG. 9 is a circuit block diagram for describing an operation of the uninterruptible power supply apparatus during the overload operation.

In FIG. 9, the AC power supplied from commercial AC power supply 15 is converted into DC power by converter 1, and the DC power is supplied to DC line DL. DC power of battery 16 is supplied to DC line DL through bidirectional chopper 2. The DC power supplied from converter 1 and bidirectional chopper 2 to DC line DL is converted into AC power by inverter 3 and converter 4, and the AC power is supplied to load 17.

Assuming that 150% AC power of rated power Pc is supplied to load 17, as shown in FIG. 9, 100% AC power is supplied from commercial AC power supply 15 to converter 1, 50% DC power is supplied from battery 16 to bidirectional chopper 2, 100% AC power is supplied from inverter 3 to load 17, and 50% AC power is supplied from converter 4 to load 17.

When a power failure occurs in commercial AC power supply 15 during the normal operation or during the overload operation, switch S1 is turned off by control unit 31, and the operation of converter 1 is stopped by control unit 32. Switch S5 is turned off, and an operation of converter 4 is stopped, by control unit 35. Also, bidirectional chopper 2 is controlled by control unit 33 such that DC voltage VD of DC line DL becomes equal to reference voltage VDR.

Figure 10:
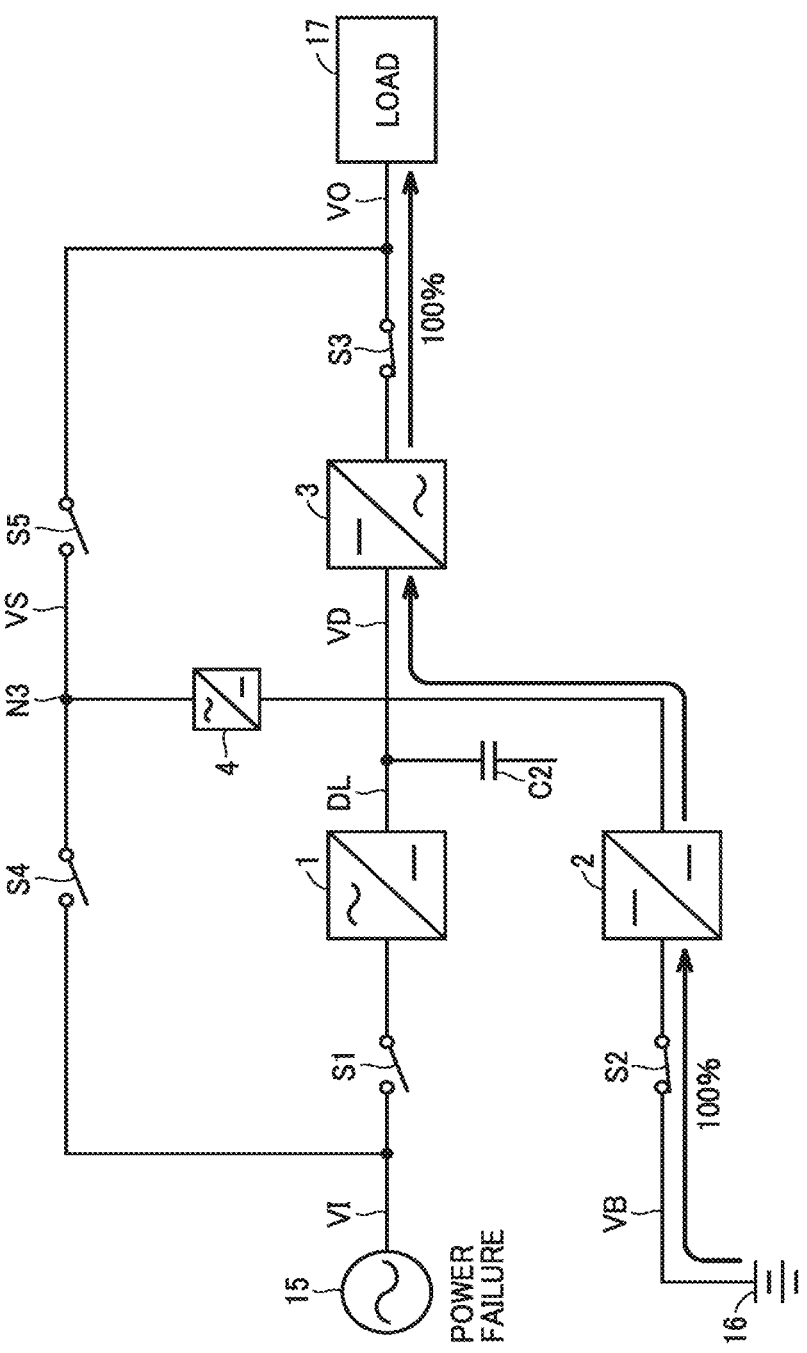
FIG. 10 is a circuit block diagram for describing an operation of the uninterruptible power supply apparatus in a power failure of a commercial AC power supply.

FIG. 10 is a circuit block diagram for describing an operation of the uninterruptible power supply apparatus in a power failure of commercial AC power supply 15. In FIG. 10, DC power of battery 16 is supplied to DC line DL through bidirectional chopper 2. The DC power supplied from bidirectional chopper 2 to DC line DL is converted into AC power by inverter 3, and the AC power is supplied to load 17.

Assuming that rated power Pc of load 17 is 100%, as shown in FIG. 10, 100% DC power is supplied from battery 16 to inverter 3 through bidirectional chopper 2, and 100% AC power is supplied from inverter 3 to load 17. Thus, even when a power failure has occurred in commercial AC power supply 15, rated power Pc can be supplied to load 17 during a period in which DC power is stored in battery 16.

As described above, in the present embodiment, bidirectional converter 14 is provided that during the high-speed charging operation, operates in cooperation with AC/DC converter 11, converts AC power supplied from commercial AC power supply 15 into DC power, and supplies the DC power to DC line DL. This can prevent a shortage of DC power during the high-speed charging operation and enables high-speed charging of battery 16 while operating load 17. Also, cost can be lower than when a high-capacity uninterruptible power supply apparatus is used or when an external charger is added.

During the overload operation, bidirectional converter 14 operates in cooperation with DC/AC converter 13, converts DC power received from DC line DL into AC power, and supplies the AC power to load 17. Thus, power larger than rated power Pc can be supplied to load 17 during a period in which DC power is stored in battery 16.

Figure 11:
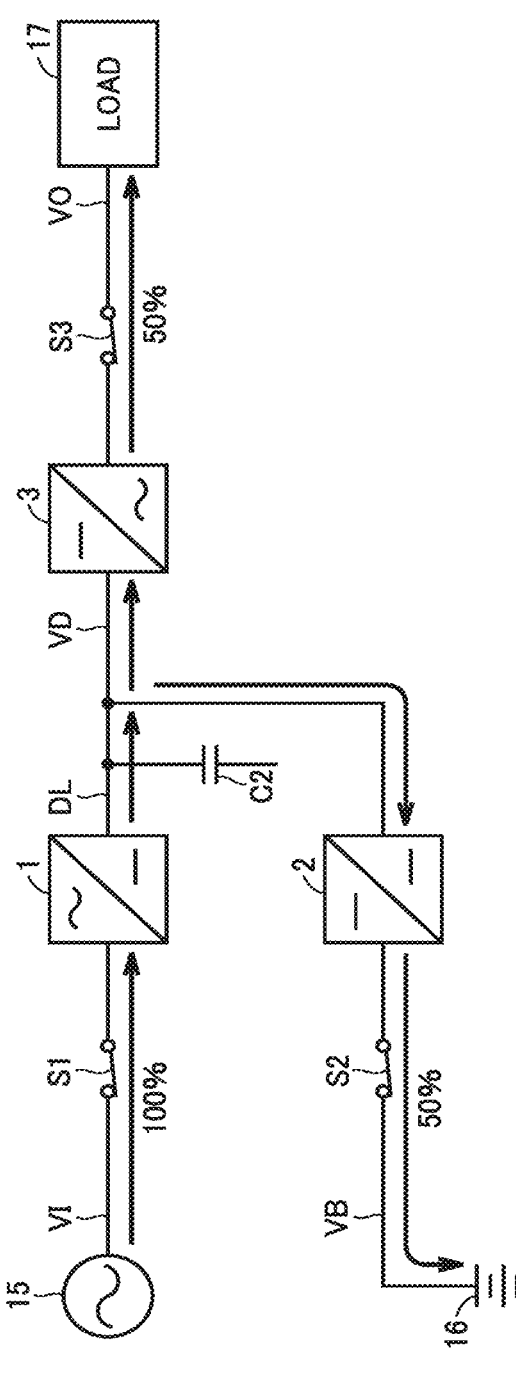
FIG. 11 is a circuit block diagram showing a comparative example of the embodiment.

FIG. 11 is a circuit block diagram showing Comparative Example 1 of the embodiment, which is a diagram compared with FIG. 7. Referring to FIG. 11, Comparative Example 1 is different from the embodiment in that converter 4 and switches S4, S5 are not provided. In other words, Comparative Example 1 is a conventional uninterruptible power supply apparatus.

In Comparative Example 1, the capacity of converter 1, the capacity of bidirectional chopper 2, the capacity of inverter 3, and rated capacity Pc of load 17 are set to the same value. It is assumed that rated capacity Pc of load 17 is 100%. During the high-speed charging operation, 100% AC power is supplied from commercial AC power supply 15 to converter 1, 100% DC power is generated by converter 1, 50% DC power is supplied from bidirectional chopper 2 to battery 16, and 50% AC power is supplied from inverter 3 to load 17.

During the high-speed charging operation, thus, only 50% AC power of rated power Pc can be supplied to load 17, and accordingly, load 17 can be no longer operated normally. Consequently, Comparative Example 1 fails to charge battery 16 at high speed while operating load 17.

Figure 12:
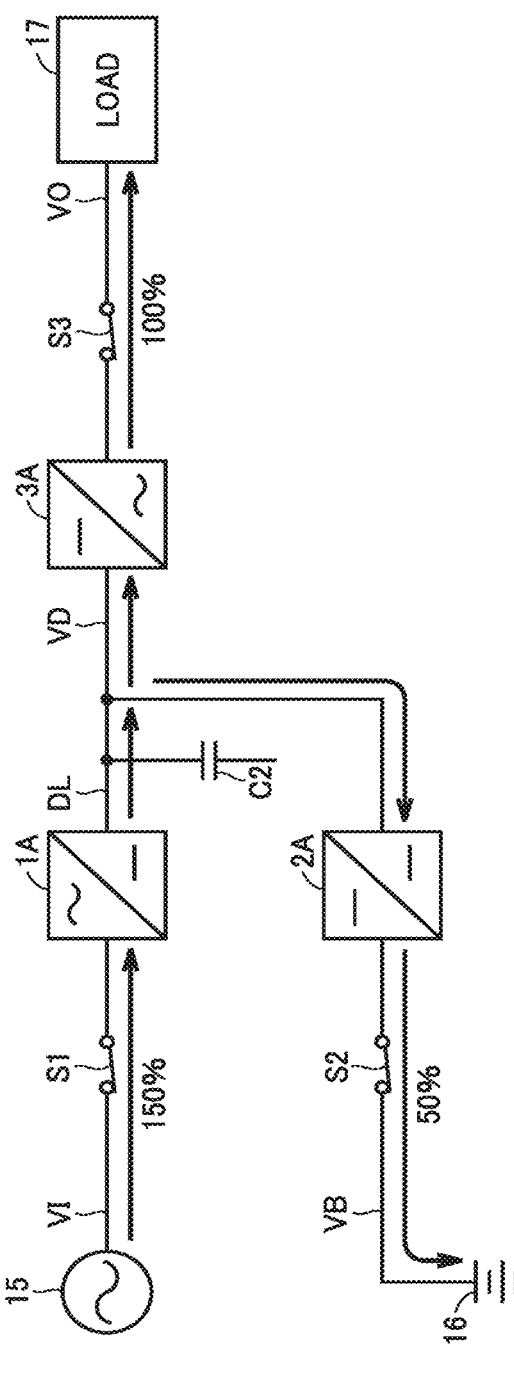
FIG. 12 is a circuit block diagram showing another comparative example of the embodiment.

FIG. 12 is a circuit block diagram showing Comparative Example 2 of the embodiment, which is a diagram compared with FIG. 11. Referring to FIG. 12, Comparative Example 2 is different from Comparative Example 1 in that converter 1, bidirectional chopper 2, and inverter 3 are replaced with a converter 1A, a bidirectional chopper 2A, and an inverter 3A, respectively. The capacities of converter 1A, bidirectional chopper 2A, and inverter 3A are set to be 1.5 times the capacities of converter 1, bidirectional chopper 2, and inverter 3, respectively.

During the high-speed charging operation, 150% AC power is supplied from commercial AC power supply 15 to converter 1A, 150% DC power is generated by converter 1A, 50% DC power is supplied from bidirectional chopper 2A to battery 16, and 100% AC power is supplied from inverter 3A to load 17.

During the high-speed charging operation, thus, 100% AC power, which is rated power Pc, can be supplied to load 17, enabling high-speed charging of battery 16 while operating load 17. Comparative Example 2, however, may hold an excess capacity, leading to a larger apparatus size and a higher cost.

Figure 13:
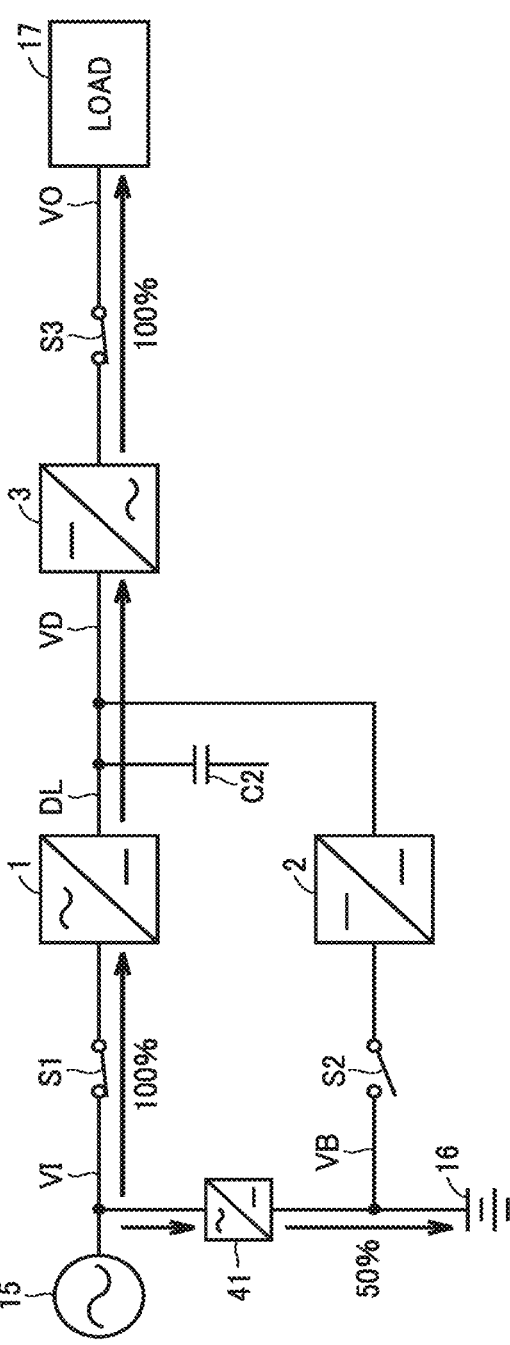
FIG. 13 is a circuit block diagram showing still another comparative example of the embodiment.

FIG. 13 is a circuit block diagram showing Comparative Example 3 of the embodiment, which is a diagram compared with FIG. 11. Referring to FIG. 13, Comparative Example 3 is different from Comparative Example 1 in that an external charger 41 is added. The capacity of charger 41 is set to 50% of rated capacity Pc of load 17.

During the high-speed charging operation, 50% AC power is supplied from commercial AC power supply 15 to charger 41, and 50% DC power is supplied from charger 41 to battery 16. Also, 100% AC power is supplied from commercial AC power supply 15 to converter 1, 100% DC power is generated by converter 1, and 100% AC power is supplied from inverter 3 to load 17.

Thus, battery 16 can be charged at high speed while load 17 is being operated. However, externally providing charger 41 leads to a higher cost and reduced maintainability of the system. In addition, charger 41 cannot be used other than for high-speed charging of battery 16.

It should be understood that the embodiments disclosed herein are illustrative and non-restrictive in every respect. The scope of the present invention is defined by the scope of the claims, rather than the embodiments described above, and is intended to include any modifications within the scope and meaning equivalent to the scope of the claims.

REFERENCE SIGNS LIST

T1 AC input terminal; T2 battery terminal; T3 AC output terminal; S1 to S5 switch; C1 to C4 capacitor; L1 to L4 reactor; CD1 to CD4 current detector; 1, 1A, 4 converter; DL DC line; 2, 2A bidirectional chopper; 3, 3A inverter; 5 operation unit; 6 controller; 15 commercial AC power supply; 16 battery; 17 load; Q1 to Q6, Q11 to Q16, Q21 to Q26 IGBT; D1 to D6, D11 to D16, D21 to D26 diode; 21 to 25 voltage detector; 26 power failure detector; 27, 28 comparator; 29 control circuit; 31 to 35 control unit; 36 communication line; 41 charger.

The invention claimed is:

1. An uninterruptible power supply apparatus comprising:
a first power converter that
in a normal state of an AC power supply, converts AC power supplied from the AC power supply into DC power and supplies the DC power to a DC line, and
in a power failure of the AC power supply, stops an operation of the first power converter;
a second power converter that converts the DC power received from the DC line into AC power and supplies the AC power to a load;
a third power converter that
in the normal state of the AC power supply, stores the DC power received from the DC line in a power storage device, and
in the power failure of the AC power supply, supplies the DC power of the power storage device to the DC line; and
a fourth power converter that, in a first case where high-speed charging of the power storage device is performed, operates in cooperation with the first power converter, converts the AC power supplied from the AC power supply into DC power, and supplies the DC power to the DC line,
wherein
in a second case where an overload operation is performed, the third power converter supplies the DC power of the power storage device to the DC line even in the normal state of the AC power supply, and
in the second case, the fourth power converter operates in cooperation with the second power converter, converts the DC power received from the DC line into AC power, and supplies the AC power to the load, and
wherein the fourth power converter includes
a switching circuit that
in the first case, connects an AC node to the AC power supply, and
in the second case, connects the AC node to the load, and
a fifth power converter that
in the first case, converts the AC power supplied from the AC power supply through the AC node into DC power and supplies the DC power to the DC line, and
in the second case, converts the DC power received from the DC line into AC power and supplies the AC power to the load through the AC node.

2. The uninterruptible power supply apparatus according to claim 1, wherein the switching circuit electrically isolates the AC node from the AC power supply and the load in the power failure of the AC power supply.

3. The uninterruptible power supply apparatus according to claim 1, wherein
the first power converter, the second power converter, and the fifth power converter are identical in circuit configuration,
the first power converter and the second power converter are identical in capacity, and
the fifth power converter has a capacity smaller than a capacity of each of the first power converter and the second power converter.

4. The uninterruptible power supply apparatus according to claim 3, wherein
a ratio between an output of the fifth power converter and an output of the first power converter in the first case is controlled to be equal to a ratio between the capacity of the fifth power converter and the capacity of the first power converter, and
a ratio of an output of the fifth power converter and an output of the second power converter in the second case is controlled to be equal to a ratio between the capacity of the fifth power converter and the capacity of the second power converter.

5. The uninterruptible power supply apparatus according to claim 1, wherein the power storage device is a lithium-ion battery.

* * * * *